(12) United States Patent
Morris (10) Patent No.: US 8,836,335 B2
(45) Date of Patent: Sep. 16, 2014

(54) MULTI-CAPACITOR SYSTEM FOR ELECTROMAGNETIC LOGGING TOOL

(75) Inventor: Steven Allen Morris, Spring, TX (US)

(73) Assignee: Baker Hughes Incorporated, Houston, TX (US)

(*) Notice: Subject to any disclaimer, the term of this patent is extended or adjusted under 35 U.S.C. 154(b) by 272 days.

(21) Appl. No.: 13/495,182

(22) Filed: Jun. 13, 2012

(65) Prior Publication Data
US 2013/0335091 A1     Dec. 19, 2013

(51) Int. Cl.
G01V 3/18     (2006.01)
G01V 3/28     (2006.01)
G01V 3/30     (2006.01)
G01V 3/08     (2006.01)

(52) U.S. Cl.
CPC .. G01V 3/28 (2013.01); G01V 3/30 (2013.01); G01V 3/081 (2013.01)
USPC ......................................................... 324/339

(58) Field of Classification Search
USPC ................................................. 324/323–344
See application file for complete search history.

(56) References Cited

U.S. PATENT DOCUMENTS

| | | | |
|---|---|---|---|
| 3,737,768 A * | 6/1973 | Lazenby et al. | 324/336 |
| 3,973,168 A | 8/1976 | Kearsley | |
| 4,849,699 A | 7/1989 | Gill et al. | |
| 4,965,522 A * | 10/1990 | Hazen et al. | 324/339 |
| 5,426,367 A * | 6/1995 | Martin et al. | 324/339 |
| 5,754,011 A | 5/1998 | Frus et al. | |
| 6,018,243 A | 1/2000 | Taicher et al. | |
| 6,603,312 B2 * | 8/2003 | Sinclair | 324/339 |
| 7,199,586 B2 | 4/2007 | Fanini et al. | |
| 7,301,429 B1 | 11/2007 | Hall et al. | |
| 2005/0189945 A1 | 9/2005 | Reiderman | |
| 2008/0018334 A1 | 1/2008 | Reiderman | |
| 2009/0289808 A1 | 11/2009 | Prammer | |
| 2010/0097065 A1 | 4/2010 | Itskovich et al. | |

(Continued)

FOREIGN PATENT DOCUMENTS

WO     0148514     7/2001
WO     2009006469     1/2009

OTHER PUBLICATIONS

Notification of Transmittal of the International Search Report and the Written Opinion of the International Searching Authority, or the Declaration; PCT/US2013/045155; Mailed: Feb. 7, 2014, 12 pages.

(Continued)

Primary Examiner — Jay Patidar
(74) Attorney, Agent, or Firm — Cantor Colburn LLP (57) ABSTRACT

An apparatus for estimating a property of an earth formation penetrated by a borehole includes: a borehole carrier; a first switchable-magnet; a first energy storage device coupled to the first switchable magnet; a second switchable-magnet; a second energy storage device coupled to the second switchable-magnet; at least one voltage source having a first polarity and a second polarity opposite of the first polarity; and an electrical circuit configured to charge the first energy storage device and the second energy storage device at the same time and to sequentially discharge the first energy storage device and the second energy storage device, the electrical circuit being further configured to charge the first and second energy storage devices to the first polarity and then charge the first and second energy storage devices to the second polarity after the first and second energy storage devices are discharged.

21 Claims, 6 Drawing Sheets

(56) References Cited

U.S. PATENT DOCUMENTS

| | | |
|---|---|---|
| 2010/0114492 A1 | 5/2010 | Zhao et al. |
| 2010/0191469 A1 | 7/2010 | Mogilatov |
| 2011/0036569 A1 | 2/2011 | Bass et al. |
| 2011/0050233 A1 | 3/2011 | Sato |
| 2011/0057647 A1 | 3/2011 | Biester et al. |
| 2012/0139530 A1 | 6/2012 | McElhinney et al. |

OTHER PUBLICATIONS

Kriegshauser et al, A New Multicomponent Induction Logging Tool to Resolve Anisotropic Formations, SPWLA 41st Annual Logging Symposium, Jun. 4-7, 2000, pp. 1-14.

* cited by examiner

MULTI-CAPACITOR SYSTEM FOR ELECTROMAGNETIC LOGGING TOOL

BACKGROUND

Geologic formations may be used for many purposes such as hydrocarbon production, geothermal production or carbon dioxide sequestration. In general, boreholes are drilled into the earth to gain access to the formations to perform measurements related to the intended purpose of the formation. Measurements performed in boreholes at various depths are generally referred to as well logging.

In one embodiment of well logging referred to as logging-while-drilling or measurement-while-drilling, a logging instrument or tool is disposed at a bottomhole assembly (BHA) at the distal end of a drill string. As the drill string rotates to drill the borehole, the logging tool performs the measurements. The measurements are generally logged with a depth at which they were performed. Together, the measurements and associated depths create a well log. The well log may be presented graphically or as an image of changes in measured properties.

One type of downhole measurement is of electrical properties of the earth formation. The electrical properties may provide information about the geologic materials that make up a formation, such as their likely oil, gas and water content.

The electrical properties of the earth formation may be measured by an induction well logging technique. In induction well logging, a transmitter transmits electromagnetic energy through a transmitter antenna into a formation. The changing magnetic fields associated with the energy induce eddy currents in the formation. The eddy currents in turn emit electromagnetic energy that is received by a receiver via a receiver antenna. Characteristics of the received electromagnetic energy are then related to the electrical properties of the formation. For example, a formation with greater conductive properties will have higher magnitude eddy currents generating stronger signals. Unfortunately, with this type of well logging, the depth of measurements into the formation may be limited by the range at which the electromagnetic energy can penetrate the formation rock. Hence, it would be appreciated in the drilling industry if induction logging tools could be improved to perform measurements deeper and more accurately in geologic formations.

Challenges are presented when performing induction logging in a while-drilling application because an induction logging tool performing the measurements rotates with the drill string as the borehole is being drilled. With each revolution of the drill string, the induction logging tool is conveyed deeper into the borehole. If measurements are performed slowly, then the measurements may miss parts of the formation or measurements may not be able to be correlated with an azimuthal direction from the borehole. Hence, it would be appreciated by the drilling industry if induction logging tools could be improved to perform measurements more quickly.

BRIEF SUMMARY

Disclosed is an apparatus for estimating a property of an earth formation penetrated by a borehole. The apparatus includes: a carrier configured to be conveyed through the borehole; a first switchable-magnet disposed at the carrier and configured to change a first magnetic field in the formation; a first energy storage device coupled to the first switchable magnet and configured to discharge stored first electrical energy to the first switchable-magnet; a second switchable-magnet disposed at the carrier and configured to change a second magnetic field in the formation in a direction different from the first magnetic field; a second energy storage device coupled to the second switchable-magnet and configured to discharge stored second electrical energy to the second switchable-magnet; at least one voltage source having a first polarity and a second polarity opposite of the first polarity; and an electrical circuit configured to charge the first energy storage device and the second energy storage device at the same time and to sequentially discharge the first energy storage device to the first switchable-magnet and the second energy storage device to the second switchable-magnet. The electrical circuit is further configured to charge the first and second energy storage devices to the first polarity using the at least one voltage source and then charge the first and second energy storage devices to the second polarity using the at least one voltage source after the first and second energy storage devices are discharged. The change in the first magnetic field caused by the discharging of the first energy storage device and the change in the second magnetic field caused by the discharging of the second energy storage device induce currents in the formation that generate signals used to estimate the property.

Also disclosed is a method for estimating a property of an earth formation penetrated by a borehole. The method includes: conveying a carrier through the borehole; discharging first electrical energy stored in a first energy storage device to a first switchable-magnet disposed at the carrier in order to change a first magnetic field in the formation; discharging second electrical energy stored in a second energy storage device to a second-switchable magnet disposed at the carrier in order to change a second magnetic field in the formation in a direction different from the first magnetic field; and charging the first and second energy storage devices from at least one voltage source to a first polarity and then charging the first and second energy storage devices from the at least one voltage source to a second polarity opposite of the first polarity after the first and second energy storage devices are discharged. The change in the first magnetic field caused by the discharging of the first energy storage device and the change in the second magnetic field caused by the discharging of the second energy storage device induce currents in the formation that generate signals used to estimate the property.

Further disclosed is a non-transitory computer readable medium comprising computer executable instructions for estimating a property of an earth formation penetrated by a borehole by implementing a method. The method includes: discharging first electrical energy stored in a first energy storage device to a first switchable-magnet disposed at the carrier in order to change a first magnetic field in the formation; discharging second electrical energy stored in a second energy storage device to a second-switchable magnet disposed at the carrier in order to change a second magnetic field in the formation in a direction different from the first magnetic field; and charging the first and second energy storage devices from at least one voltage source to a first polarity and then charging the first and second energy storage devices from the at least one voltage source to a second polarity opposite of the first polarity after the first and second energy storage devices are discharged. The change in the first magnetic field caused by the discharging of the first energy storage device and the change in the second magnetic field caused by the discharging of the second energy storage device induce currents in the formation that generate signals used to estimate the property.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
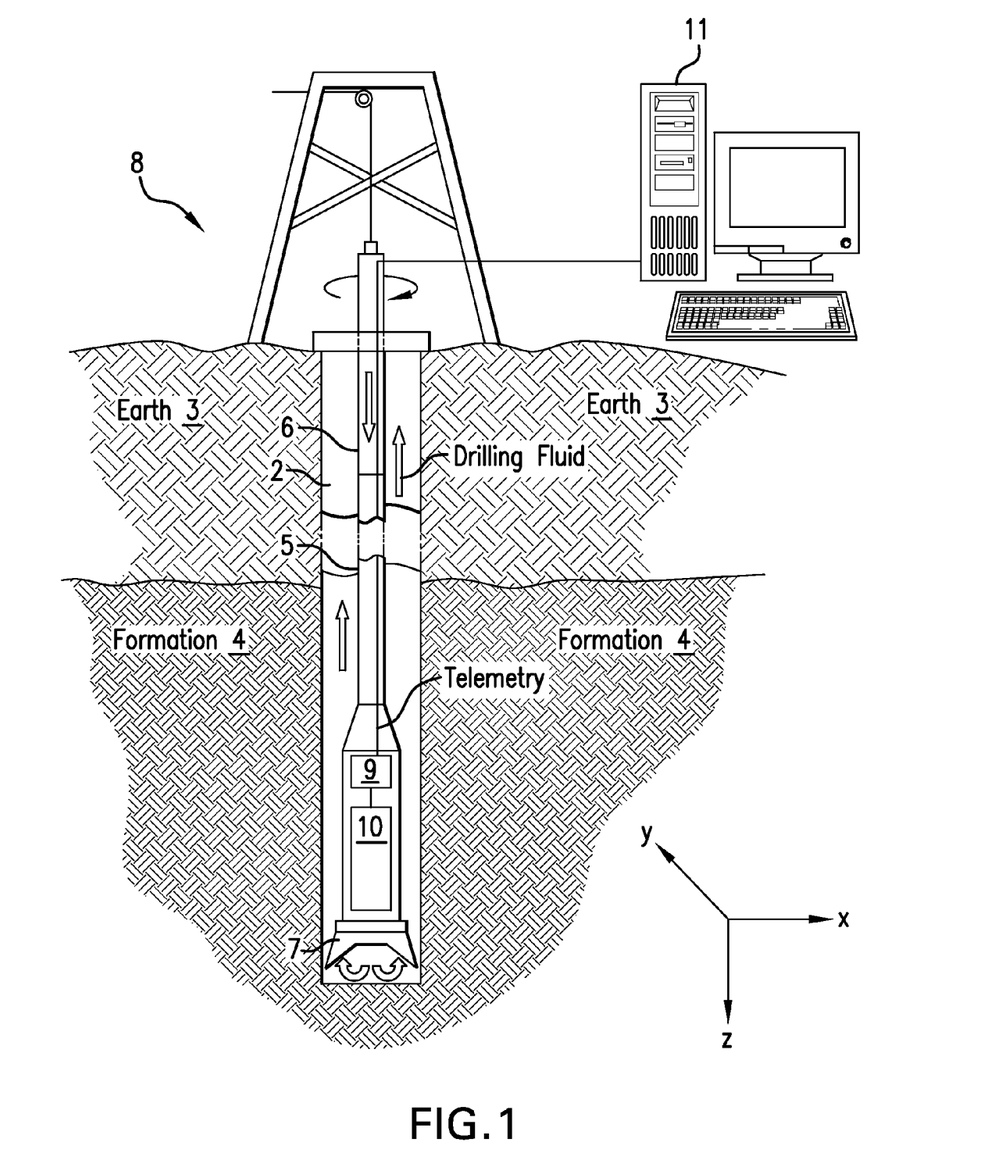
FIG. 1 illustrates an exemplary embodiment of an induction logging tool disposed in a borehole penetrating the earth.

FIG. 1 illustrates an exemplary embodiment of an induction logging tool 10 disposed in a borehole 2 penetrating the earth 3, which includes an earth formation 4. The earth formation 4 represents any subsurface materials of interest. The downhole tool 10 is conveyed through the borehole 2 by a carrier 5. In the embodiment of FIG. 1, the carrier 5 is a drill string 6 in an embodiment known as logging-while-drilling (LWD) or measurement-while-drilling (MWD). Disposed at the distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. Downhole electronics 9 are configured to operate the induction logging tool 10, process measurement data received from the tool 10, and/or act as a telemetry interface to communicate data with a computer processing system 11 disposed at the surface of the earth 3. Tool operation and/or data processing can also be performed by the computer processing system 11 in addition to or in lieu of the downhole electronics 9. The induction logging tool 10 may operate intermittently, at particular intervals, or continuously during the drilling process to provide logging data for various depths in the borehole 2 and, thus, in the formation 4. In an alternative embodiment, the carrier 5 can be an armored wireline in an embodiment known as wireline logging.

The induction logging tool 10 is configured to perform electrical induction measurements in order to measure an electrical property of the formation 4 such as resistivity or its inverse conductivity. Other properties such as material composition of the formation 4 or boundaries may be determined indirectly from the measurements.

Figure 2:
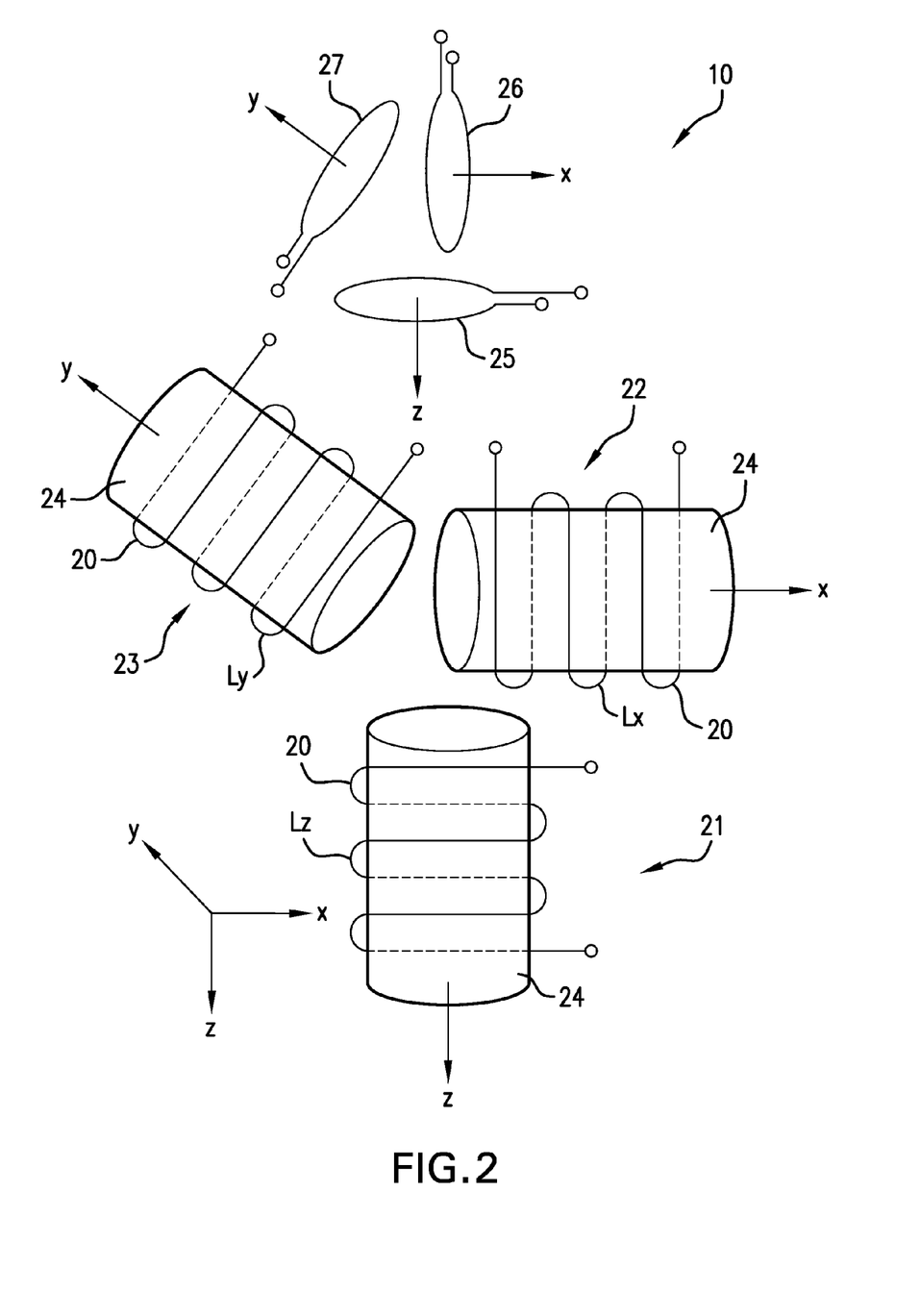
FIG. 2 depicts aspects of the induction logging tool.

Reference may be had to FIG. 2, which depicts aspects of the induction logging tool 10. The tool 10 includes a first switchable-magnet 21, a second switchable-magnet 22, and a third switchable-magnet 23. The term "switchable" relates to the magnets ability to electronically reverse the direction of a magnetic polarization of the switchable-magnet and, thus, the reverse the direction of the magnetic field generated external to the magnet. The switchable-magnets 21, 22, and 23 are configured to generate first, second, and third magnetic fields, respectively, in the formation 4. In the embodiment of FIG. 2, the switchable-magnets 21, 22 and 23 are configured to generate a magnetic field in three directions (x, y and z directions) that are orthogonal to each other, although in other embodiments the directions may not be orthogonal to each other. The switchable-magnets 21, 22 and 23 each have a coil 20 of an electrically conductive material wrapped around a magnetic core 24 of a magnetic permeable material. The magnetic polarity of the magnetic permeable material (i.e., magnet) can be rapidly reversed by a pulse or pulses of electric current flowing in the coil 20 to create a reversible magnetic dipole. In one or more embodiments, the magnetic dipole can be continuously reversed by alternating the polarity of consecutive electrical current pulses flowing in the coil 20. Receiver antennas 25, 26 and 27 receive signals from the formation 4 resulting from alternating or changing magnetic fields due to magnetic dipole reversal of the switchable magnets. In the embodiment of FIG. 2, the receiver coils are configured to receive signals in three orthogonal directions, although in other embodiments, these directions may not be orthogonal to each other. When the directions of the switchable-magnets or receiver antennas are not orthogonal, vector components may be used to correlate obtained data to the three orthogonal directions.

For clarity, the operation of one switchable-magnet is now described. The magnetic core 24 is assumed to already be magnetized in a certain direction creating a magnetic dipole, which generates a magnetic field in the formation 4. A first pulse of electrical current of a selected polarity in the coil 20 causes the corresponding magnetic core 24 to be magnetized in an opposite direction causing a reversal of the magnetic dipole. The magnetic dipole reversal results in changing the magnetic field in the formation 4. The changing magnetic field in turn generates diffusively propagating currents such as eddy currents in the earth formation 4. Note that the transition time of the dipole reversal (i.e., the time it takes for the switchable magnet to reverse polarity) is much less than the time taken for induced eddy currents in the formation to propagate through the volume of interest of the earth formation. In general, the switching time is less than five microseconds in one or more embodiments. The eddy currents generate electromagnetic energy or signals that are received by a receiver antenna. One or more characteristics of the received signals are then correlated to an electrical property of interest of the formation 4. During operation of the tool 10, continuous alternating magnetic polarity or reversal of the magnetic dipole in the magnetic core 24 provides continuously changing magnetic fields in the formation 4 for continuous probing of the formation 4 while the borehole 2 is being drilled. The induction logging tool 10 may be calibrated by analysis or in formations or formation models having known electrical properties.

In order to provide for continuous and rapid reversal of the magnetic dipoles generated by the switchable-magnets 21, 22 and 23, each of the switchable-magnets is coupled to a separate energy storage capacitor. Each capacitor is charged to a polarity at the same time and then the capacitors are sequentially discharged to the corresponding coil to generate pulses of current to sequentially change or reverse magnetic fields (associated with the corresponding switchable magnets) in various portions of the formation 4. Once all the capacitors are discharged, they are then charged to the opposite polarity. After the capacitors are charged to the opposite polarity, they are again sequentially discharged to sequentially generate changed magnetic fields in the various portions of the formation 4.

Figure 3:
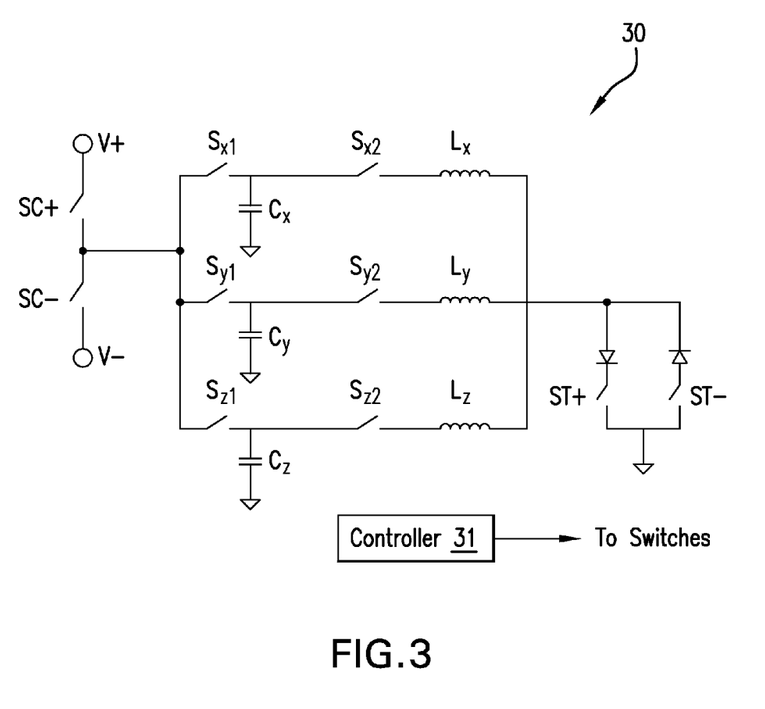
FIG. 3 depicts aspects of an electrical circuit for charging capacitors and discharging the capacitors into coils of switchable-magnets.

FIG. 3 depicts aspects of an embodiment of an electrical circuit 30 for operating the induction logging tool 10 including charging and discharging of the separate capacitors. The electrical circuit 30 or portions thereof may be incorporated into the downhole electronics 9 or the surface processing system 11. The electrical circuit 30 illustrates three switchable magnet coils—Lx (in x-direction), Ly (in y-direction) and Lz (in z-direction) for the switchable-magnets 21, 22 and 23, respectively. Alternating magnetic dipole reversals for each corresponding magnetic core 24 are produced by sending alternating positive and negative current pulses through the corresponding magnetic coils Lx, Ly and Lz. Each magnet coil Lx, Ly and Lz is coupled to a corresponding energy storage capacitor Cx, Cy and Cz, respectively. Two charging voltage sources V+ and V− are used to charge the capacitors, but not at the same time. That is, the voltage source V+ is used to charge the capacitors to voltage V+ after which the capacitors are discharged sequentially. Then, following the capacitor discharges, the capacitors are charged to voltage V− using the voltage source V− after which the capacitors are discharged sequentially. Hence, by charging the capacitors to V+, then sequentially discharging the capacitors to the corresponding coils Lx, Ly, and Lz, then charging the capacitors to V−, and then sequentially discharging to those coils, continuous magnetic dipole reversals may be implemented in the switchable-magnets 21, 22 and 23. For each magnetic dipole reversal, the resulting magnetic field extending into the formation is also reversed or approximately reversed and the resulting induced signals are received and recorded.

Still referring to FIG. 3, all switches (SC+, SC−, Sx1, Sx2, Sy1, Sy2, Sz1, Sz2, ST+, and ST−) illustrated in the circuit 30 are fast-acting electronic switches controlled by a controller 31, which may include a processor. In one embodiment, a full operation cycle of the circuit 30 proceeds in the following sequence of steps. Step 1—positive capacitor charging. Step 2—a set of three (x, y, and z) positive magnetic dipole reversals (i.e., from negative magnetic dipole to positive magnetic dipole in the magnetic core of each magnet). Step 3—negative capacitor charging. And, step 4—a set of three (x, y, and z) negative dipole reversals (i.e., from positive magnetic dipole to negative magnetic dipole in the magnetic core of each magnet). For discussion purposes, assume at the beginning of the operation cycle that all switches in FIG. 3 are open, although they may not all have to be open. In step 1 above for positive charging of capacitors Cx, Cy and Cz, switch SC+ and switches Sx1, Sy1 and Sz1 are closed, charging capacitors Cx, Cy and Cz to positive voltage V+. After charging, all switches are opened again. In step 2 above for positive pulsing of the coils Lx, Ly and Lz, switch Sx2 is closed to connect capacitor Cx to switchable-magnet coil Lx. Then, switch ST+ is closed to discharge Cx through Lx, producing a positive dipole reversal in the x-direction. Sx2 and ST+ are then opened. Then, Sy2 is closed and ST+ closes to discharge Cy through Ly, producing a positive dipole reversal in the y-direction. Sy2 and ST+ are then opened. Then, Sz2 is closed and ST+ closes to discharge Cz through Lz, producing a positive dipole reversal in the z-direction. Sz2 and ST+ are then opened completing the positive dipole reversals. In step 3 above, for negative charging of capacitors Cx, Cy and Cz, switch SC− and switches Sx1, Sy1 and Sz1 are closed charging capacitors Cx, Cy and Cz to negative voltage V−. After charging, all switches are opened again. In step 4 above for negative pulsing of the coils Lx, Ly and Lz, switch Sx2 is closed to connect capacitor Cx to switchable-magnet coil Lx. Then, switch ST− is closed to discharge Cx through Lx, producing a negative dipole reversal in the x-direction. Sx2 and ST− are the opened. Then, switch Sy2 is closed and ST− closes to discharge Cy through Ly, producing a negative dipole reversal in the y-direction. Sy2 and ST− are then opened. Then, Sz2 is closed and ST− closes to discharge Cz through Lz, producing a negative dipole reversal in the z-direction. Switches Sz2 and ST− are then opened completing the negative dipole reversals. After step 4, the operation cycle repeats itself starting again at step 1. In this way, continuous alternating magnetic dipole reversals are implemented in the magnetic cores of Lx, Ly and Lz for probing the formation 4.

Figure 4A:
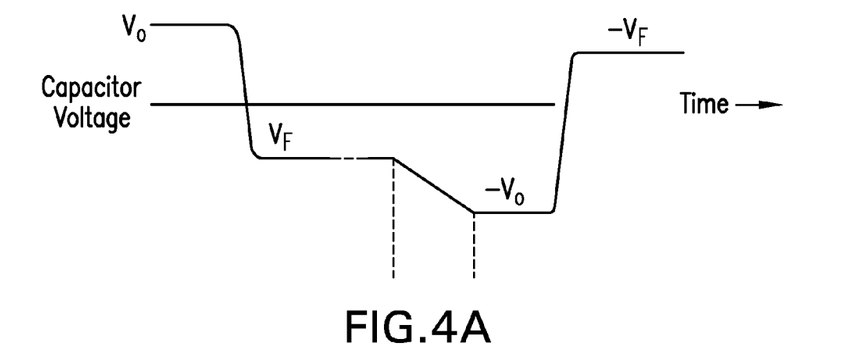
FIGS. 4A, 4B, and 4C, collectively referred to as FIG. 4, depict aspects of capacitor voltage and magnet coil current when initial capacitor voltage is positive.
Figure 4B:
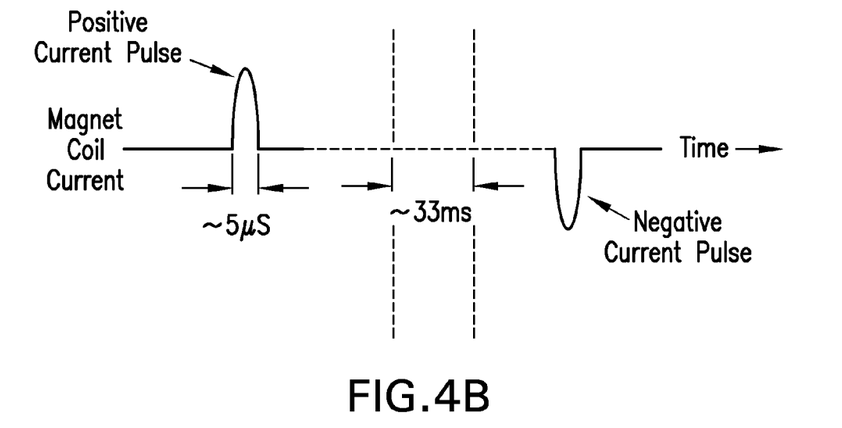
Figure 4C:
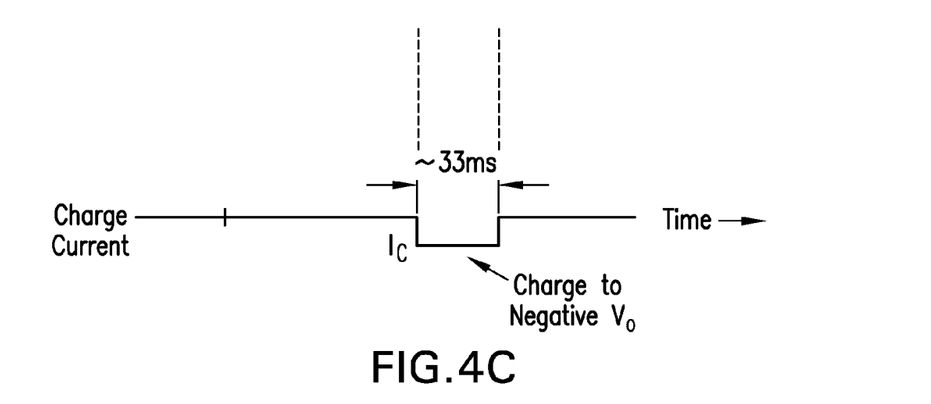

An illustrative calculation is now presented to show an example of calculating a charging time for the three capacitors. FIG. 4 illustrates capacitor voltage, switchable magnet coil current, and capacitor charge current when the initial capacitor voltage is positive as shown in FIG. 4A. For discussion purposes, it is assumed that during switching 50% of the energy in the capacitor is consumed in switching the switchable magnet and in losses in the switches. During switching, the discharging capacitor and the switchable magnet coil form a series resonant circuit. When switch ST+ is closed, a positive pulse of current, approximately a sine wave whose frequency is the frequency of the series resonant circuit, flows through the coil. This current pulse is limited to a single half-cycle by the action of the diode in series with the switch ST+ (see FIG. 3), which prevents current reversal in the coil and thus stops current in the coil upon completion of a half-cycle of the sine wave as shown in FIG. 4B. After switching, the voltage on the capacitor will be negative, and its voltage magnitude will be determined by the final energy in the capacitor, $E_f$, which equals the initial energy in the capacitor, $E_0$, less the sum of energy consumed switching the magnet plus the energy losses in the switches. In the calculation, it is assumed that for each of the switchable-magnets 21, 22 and 23, $E_f/E_0=0.5$. Assume Cx=Cy=Cz=5.6 µf; thus, Cx+Cy+Cz=16.8 µf. Assume $V_0=1700v$; thus, $V_f=V_0\sqrt{(E_f/E_0)}=(1700)\cdot\sqrt{(0.5)}=1202v$. After switching, the three capacitors (shown in FIG. 3) are charged in parallel using a constant magnitude charging current $I_C$ as shown in FIG. 4C. The time to charge is $\Delta V \cdot C/I_C$, where $\Delta V=V_0-V_f$. Assuming $I_C=0.25$ amperes, the charging time $\Delta t=\Delta V \cdot C/I_C=[(1700v-1202v) \cdot 16.8\ \mu f]/0.25\ amp=33.5\ ms$. The average power drawn for continuous operation versus pulse rate ($f_p$) is now calculated. The energy per single pulse of a switchable-magnet coil=$(1-E_f/E_0) \cdot [Cx \cdot V_0^2/2]=4.05j$. Table 1 provides power draws for various pulse rates ($f_p$) of tool operation.

TABLE 1

| Pulse Rate ($f_p$) (per sec) | Power Draw (watts) |
| --- | --- |
| 5 | 20 |
| 10 | 40 |
| 15 | 60 |
| 20 | 80 |
| 25 | 100 |
| 30 | 120 |

Figure 5:
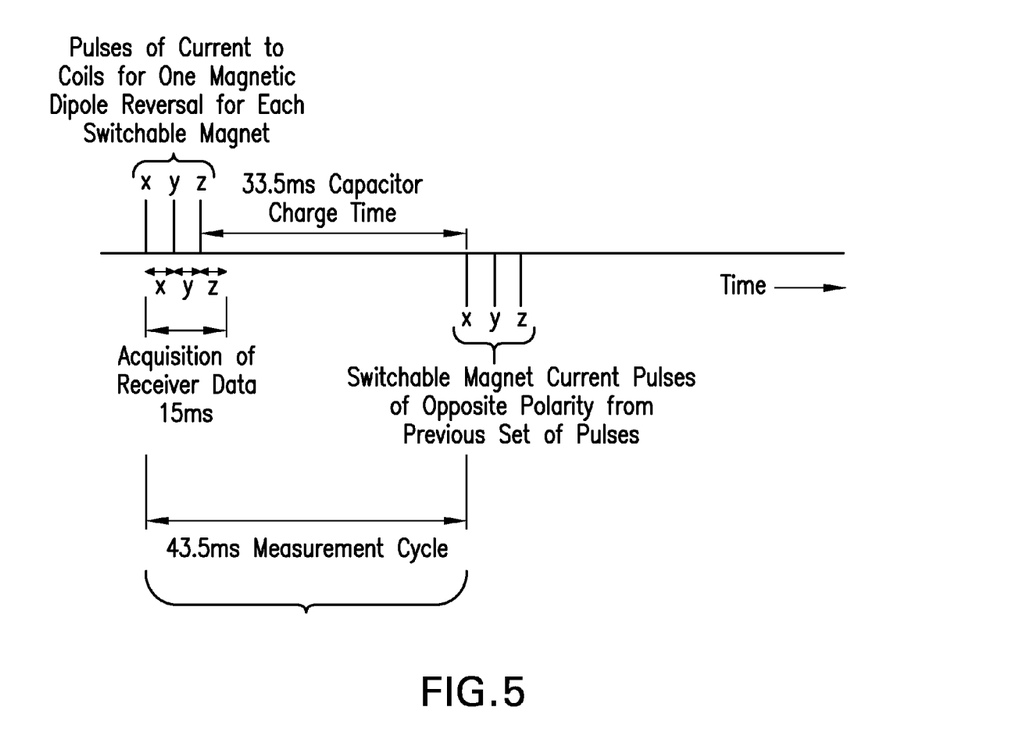
FIG. 5 depicts aspects of a time line for a measurement cycle of the induction logging tool.

FIG. 5 illustrates an exemplary embodiment of a timeline for one measurement cycle (i.e., for one magnetic dipole reversal in each switchable magnet). In one or more embodiments, the acquisition time for receiving formation signals resulting from the discharge of one capacitor to one switchable-magnet coil is 5 milliseconds (ms) and the total acquisition time for three dipole reversals is 15 ms. Hence, the time between capacitor discharges for the same type of magnetic dipole reversal is 5 ms and the total measurement cycle time is 43.5 ms (15 ms for acquisition plus 33.5 ms charge time minus 5 ms overlap in acquisition and charge time). Thus, the pulse rate ($f_p$) for this embodiment equals 1/(10 ms+33.5 ms)=23 Hz. At a pulse rate of 23 Hz, the power draw is 92 w. Table 2 provides the angular travel for this embodiment for the total acquisition time and the total measurement cycle for various drill bit rotational speeds. The angular travel $\Delta\theta$ is calculated as $\Delta\theta=360°\cdot(RPM/60) \cdot \Delta t$ and is 0.09°·RPM for 15 ms and 0.261°·RPM for 43.5 ms.

TABLE 2

| Drill Bit Speed (rpm) | Δθ Acquisition (°) | Δθ Measurement Cycle (°) |
|---|---|---|
| 50 | 4.5 | 13.05 |
| 100 | 9 | 26.1 |
| 200 | 18 | 52.2 |
| 400 | 36 | 104.4 |

It can be appreciated that the energy storage capacitors discussed above may represent other types of energy storage devices, which can store energy and discharge the energy as electrical current to the coils of the switchable-magnets. Thus, the term "energy storage device" relates to encompassing all types of energy storage devices (including capacitors) that can store energy and discharge the stored energy as electrical current to the coils of the switchable-magnets.

Figure 6:
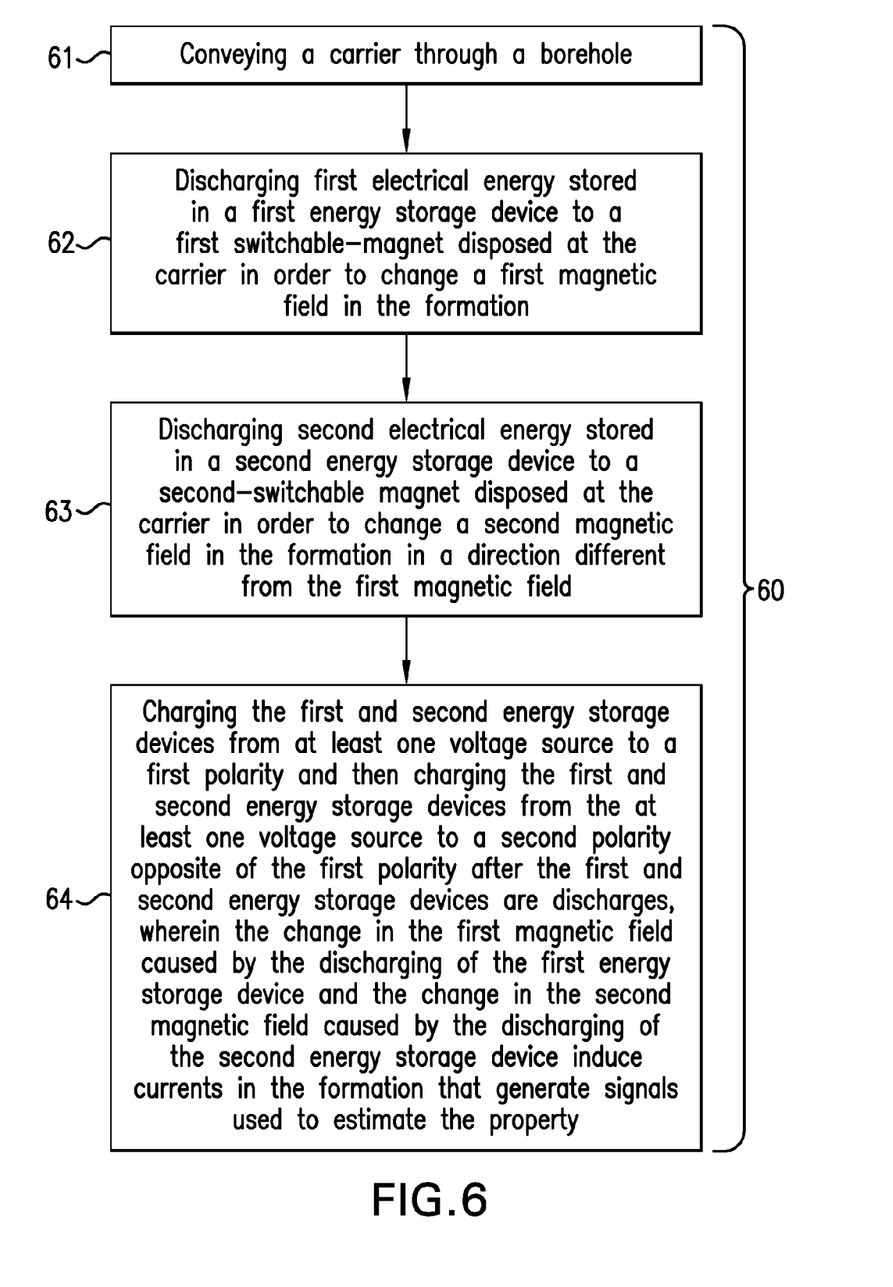
FIG. 6 illustrates a flow chart for a method for estimating a property of an earth formation penetrated by a borehole.

FIG. 6 illustrates a flow chart for a method 60 for estimating an electrical property of an earth formation penetrated by a borehole. Block 61 calls for conveying a carrier through the borehole. Block 62 calls for discharging first electrical energy stored in a first energy storage device, such as a first capacitor, to a first switchable-magnet disposed at the carrier in order to change a first magnetic field in the formation. The change in the first magnetic field is caused by generating a new magnetic field that generally has a polarity opposite of the previous magnetic field at the location of interest. Block 63 calls for discharging second electrical energy stored in a second energy storage device, such as a second capacitor, to a second switchable-magnet disposed at the carrier in order to generate a second magnetic field in the formation in a direction different from the first magnetic field. The change in the second magnetic field is caused by generating a new magnetic field that generally has a polarity opposite of the previous magnetic field at the location of interest. Block 64 calls for charging the first and second energy storage devices from at least one voltage source to a first polarity and then charging the first and second energy storage devices from the at least one voltage source to a second polarity opposite of the first polarity after the first and second energy storage devices are discharged. With respect to the above blocks, the change in the first magnetic field caused by the discharging of the first energy storage device and the change in the second magnetic field caused by the discharging of the second energy storage device induce currents in the formation that generate signals used to estimate the property.

The teachings disclosed herein provide several advantages. One advantage is deep probing of up to 100 feet or more into the formation 4 using the magnetic dipole reversals to induce formation currents. The capacitors can provide enough energy to the switchable magnet coils to generate changing magnetic fields at these distances. Thus, in one or more embodiments, an electrical property of the formation 4 can be determined up to 100 feet or more ahead of the drill bit 7 while the borehole 2 is being drilled.

Another advantage relates to providing while-drilling measurements more rapidly than conventional tools. In order to measure resistivity properly in one or more embodiments, it is necessary to generate magnetic dipole reversals in three orthogonal directions, x, y and z, for each measurement in a measurement cycle. It is important that these measurements be as close together as possible in their angular direction relative to the borehole axis, so that the x and y measurements (defining a plane perpendicular to the borehole axis) are positioned correctly. If there is a long delay between x and y measurements, the tool rotation will cause the x and y measurements to be misaligned, producing erroneous or less accurate results. This misalignment may result from tool rotational movement from the time of the magnetic dipole reversal to the end on the associated signal acquisition time interval. Because the x and y measurements are in the same plane, as little tool rotational movement as possible is desired between the time of the magnetic dipole reversal and the end of the associated signal acquisition time interval in order to distinguish between the two measurement directions and obtain more accurate measurements. If the tool used only a single capacitor to store energy for all of the capacitors, then that same capacitor would have to be charged after every discharge to each of the capacitors causing the tool to rotate too much during charging for the x and y measurements to be properly aligned. The use of three capacitors for the three switchable magnets (x, y and z directions) allows the three magnetic dipole reversals to be closely spaced in time, reducing errors introduced by tool rotation in the x and y measurements. In one or more embodiments of operation, measurements are performed rapidly in succession, in sets of three (x, y and z), while charging of the capacitors is done during the relatively long gaps between measurement sets as shown in FIG. 5.

In support of the teachings herein, various analysis components may be used, including a digital and/or an analog system. For example, the downhole electronics 9, the surface computer processing 11 the electrical circuit 30, the controller 31, or voltage sources V+ and V− may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list or string of at least two terms is intended to mean any term or combination of terms. The terms "first," "second" and "third" are used to distinguish elements and are not used to denote a particular order. The term "couple" relates to coupling a first component to a second component either directly or indirectly through an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. An apparatus for estimating a property of an earth formation penetrated by a borehole, the apparatus comprising:
    a carrier configured to be conveyed through the borehole;
    a first switchable-magnet disposed at the carrier and configured to change a first magnetic field in the formation;
    a first energy storage device coupled to the first switchable magnet and configured to discharge stored first electrical energy to the first switchable-magnet;
    a second switchable-magnet disposed at the carrier and configured to change a second magnetic field in the formation in a direction different from the first magnetic field;
    a second energy storage device coupled to the second switchable-magnet and configured to discharge stored second electrical energy to the second switchable-magnet;
    at least one voltage source having a first polarity and a second polarity opposite of the first polarity; and
    an electrical circuit configured to charge the first energy storage device and the second energy storage device at the same time and to sequentially discharge the first energy storage device to the first switchable-magnet and the second energy storage device to the second switchable-magnet, the electrical circuit being further configured to charge the first and second energy storage devices to the first polarity using the at least one voltage source and then charge the first and second energy storage devices to the second polarity using the at least one voltage source after the first and second energy storage devices are discharged;
    wherein the change in the first magnetic field caused by the discharging of the first energy storage device and the change in the second magnetic field caused by the discharging of the second energy storage device induce currents in the formation that generate signals used to estimate the property.

2. The apparatus according to claim 1, wherein the first switchable-magnet comprises a first coil wrapped around a first magnetic core comprising a first magnetic permeable material and the second switchable-magnet comprises a second coil wrapped around a second magnetic core comprising a second magnetic permeable material, wherein discharge of the first energy storage device generates a first magnetic dipole in the first magnetic permeable material and discharge of the second energy storage device generates a second magnetic dipole in the second magnetic permeable material.

3. The apparatus according to claim 2, wherein the discharge of the first energy storage device causes a magnetic dipole reversal of the first magnetic dipole and the discharge of the second energy storage device causes a magnetic dipole reversal of the second magnetic dipole.

4. The apparatus according to claim 1, wherein the electrical circuit comprises a plurality of electronic switches and the apparatus further comprises a processor configured to operate the electronic switches to charge and to discharge the first and second energy storage devices.

5. The apparatus according to claim 1, further comprising a third energy storage device coupled to a third switchable-magnet configured to receive discharged third electrical energy stored in the third energy storage device and to generate a third electromagnetic field in the formation in a direction different from the second magnetic field, wherein the electrical circuit is further configured to charge the third energy storage device from the at least one voltage source at the same time the first and second energy storage devices are being charged and to sequentially discharge the third energy storage device after the second energy storage device is discharged.

6. The apparatus according to claim 5, wherein the first, second and third switchable magnets are configured to generate magnetic fields that are orthogonal to each other.

7. The apparatus according to claim 5, wherein the first energy storage device comprises a first capacitor, the second energy storage device comprises a second capacitor, and the third energy storage device comprises a third capacitor.

8. The apparatus according to claim 5, wherein the electrical circuit is further configured to discharge the first, second, and third energy storage devices within a forty-five degree rotation of the drill string.

9. The apparatus according to claim 8, wherein the carrier is a drill string and the electrical circuit is configured to perform a set of measurements comprising two dipole reversals of the first, second, and third switchable-magnets within a ninety degree rotation of the drill string.

10. The apparatus according to claim 1, wherein the carrier comprises a drill string having a drill bit, coiled tubing, a wireline, or a slickline.

11. The apparatus according to claim 10, wherein the first switchable-magnet is configured to generate the first magnetic field ahead of the drill bit drilling the borehole.

12. The apparatus according to claim 1, wherein the property is resistivity or conductivity.

13. The apparatus according to claim 1, wherein the at least one voltage source comprises a first voltage source having the first polarity and a second voltage source having the second polarity.

14. A method for estimating a property of an earth formation penetrated by a borehole, the method comprising:
    conveying a carrier through the borehole;
    discharging first electrical energy stored in a first energy storage device to a first switchable-magnet disposed at the carrier in order to change a first magnetic field in the formation;

discharging second electrical energy stored in a second energy storage device to a second-switchable magnet disposed at the carrier in order to change a second magnetic field in the formation in a direction different from the first magnetic field; and charging the first and second energy storage devices from at least one voltage source to a first polarity and then charging the first and second energy storage devices from the at least one voltage source to a second polarity opposite of the first polarity after the first and second energy storage devices are discharged;

wherein the change in the first magnetic field caused by the discharging of the first energy storage device and the change in the second magnetic field caused by the discharging of the second energy storage device induce currents in the formation that generate signals used to estimate the property.

15. The method according to claim 14, further comprising discharging third electrical energy stored in a third energy storage device to a third switchable-magnet disposed at the carrier in order to change a third magnetic field in the formation in a direction different from the first and second magnetic fields, wherein the change in the third magnetic field caused by the discharging of the third energy storage device induces currents in the formation that generate signals used to estimate the property.

16. The method according to claim 14, wherein the first switchable-magnet comprises a first coil wrapped around a first magnetic core comprising a first magnetic permeable material, the second switchable-magnet comprises a second coil wrapped around a second magnetic core comprising a second magnetic permeable material, and the third switchable-magnet comprises a third coil wrapped around a third magnetic permeable material, and wherein discharge of the first energy storage device generates a first magnetic dipole in the first magnetic permeable material, discharge of the second energy storage device generates a second magnetic dipole in the second magnetic permeable material, and discharge of the third energy storage device generates a third magnetic dipole in the third magnetic permeable material.

17. The method according to claim 16, wherein a directly following discharge of the first energy storage device causes a magnetic dipole reversal of the first magnetic dipole, a directly following discharge of the second energy storage device causes a magnetic dipole reversal of the second magnetic dipole, and a directly following discharge of the third energy storage device causes a magnetic dipole reversal in the third magnetic permeable material.

18. The method according to claim 16, wherein the carrier is a drill string.

19. The method according to claim 18, wherein the discharging of the first, second and third energy storage devices for two dipole reversals of the first, second and third switchable magnets is performed within a ninety degree rotation of the drill string.

20. The method according to claim 14, wherein the property is resistivity or conductivity.

21. A non-transitory computer readable medium comprising computer executable instructions for estimating a property of an earth formation penetrated by a borehole by implementing a method comprising:

discharging first electrical energy stored in a first energy storage device to a first switchable-magnet disposed at the carrier in order to change a first magnetic field in the formation;

discharging second electrical energy stored in a second energy storage device to a second-switchable magnet disposed at the carrier in order to change a second magnetic field in the formation in a direction different from the first magnetic field; and charging the first and second energy storage devices from at least one voltage source to a first polarity and then charging the first and second energy storage devices from the at least one voltage source to a second polarity opposite of the first polarity after the first and second energy storage devices are discharged;

wherein the change in the first magnetic field caused by consecutive discharges of the first energy storage device and the change in the second magnetic field caused by consecutive discharges of the second energy storage device induce currents in the formation that generate signals used to estimate the property.

\* \* \* \* \*